(12) United States Patent
Wei

(10) Patent No.: US 6,434,249 B1
(45) Date of Patent: Aug. 13, 2002

(54) EARPHONE WIRE WINDING BOX WITH COAXIAL AND DUAL WHEELS

(76) Inventor: Jose Wei, P.O Box No. 6-57, Chung-Ho, Taipei 235 (TW)

( * ) Notice: Subject to any disclaimer, the term of this patent is extended or adjusted under 35 U.S.C. 154(b) by 0 days.

(21) Appl. No.: 09/987,791

(22) Filed: Nov. 16, 2001

(51) Int. Cl.⁷ .............................................. H04R 25/00
(52) U.S. Cl. .................. 381/370; 381/384; 455/90; 242/400.1
(58) Field of Search ................. 381/370, 380, 381/384; 439/4, 22, 27, 501; 181/129, 130, 135; 455/90, 351, 575; 242/400.1, 405.2, 407, 385.4; 379/430

(56) References Cited

U.S. PATENT DOCUMENTS 3,984,645 A * 10/1976 Kresch ........................ 379/430
5,684,883 A * 11/1997 Chen ........................... 381/370
5,706,353 A * 1/1998 Arai et al. .................. 381/370

* cited by examiner

*Primary Examiner*—Huyen Le

(57) ABSTRACT

An earphone wire winding box with coaxial and dual wheels has a communication wire, a big turning wheel with a longer outer diameter and a small turning wheel with a shorter outer diameter; both of the center holes thereof are respectively and lively jointed into an uni-axial portion; the wheel planes of the big and small turning wheels are respectively formed into storage grooves for the communication wire to coil around therein; when quite a length of the upper wire inside the storage groove of the big turning wheel is pulled out, the lower wire inside the storage groove of the small turning wheel descends only an extremely short distance, so that the earphone wire and the plug wire can be designed as one to eliminate any undesired connectional situation between them.

9 Claims, 20 Drawing Sheets

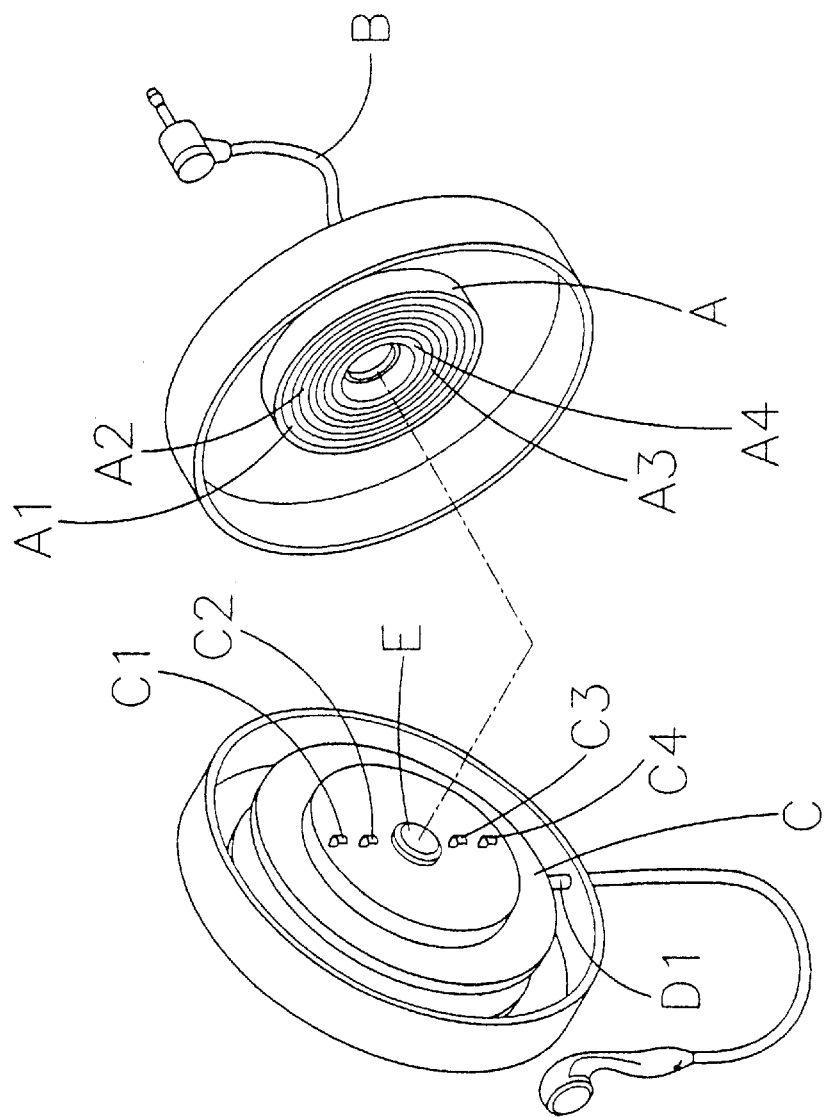
FIG: 19 (Prior Art)

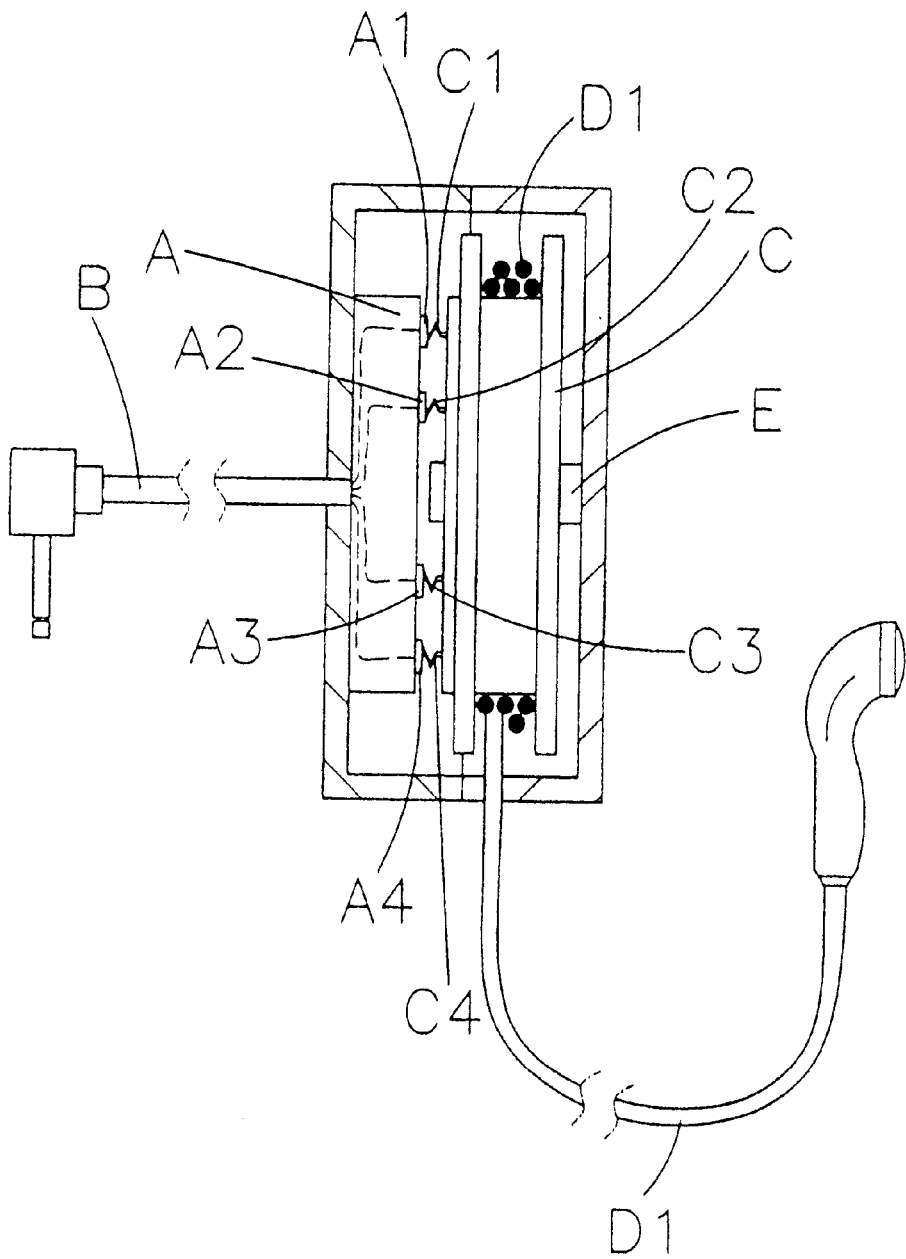
FIG:20
(Prior Art)

EARPHONE WIRE WINDING BOX WITH COAXIAL AND DUAL WHEELS

BACKGROUND OF THE INVENTION

1) Field of the Invention

The present invention provides an earphone wire winding box with coaxial and dual wheels, more especially an earphone wire winding box of a conductive structure without jointed point.

2) Description of the Prior Art

Accordingly, the conventional earphone wire winding box, as shown in FIGS. 19 and 20, comprises a fixed and immovable disk of a printed circuit (PC) board (A) with a plurality of copper ring planes (A1, A2, A3, A4) plated on the outer plate surface; the communication input end of the PC board (A) connects with the plug wire (B) of the earphone; a turning wheel (C) with a spiral spring (not shown in the FIG.) inside can store the earphone wire (D1); the outer disk surface of the turning wheel (C) connects with conductive contacting springs (C1, C2, C3, C4) correspondingly contacting with the copper ring planes (A1, A2, A3, A4); wherein, the connecting end of the earphone wire (D1) connects with the input ends of the contacting springs (C1, C2, C3, C4); the turning wheel (C) is lively jointed to the axel (E) and the PC board (A) is firmed secured to the axel (E); thereby, when the earphone wire (D1) is pulled out, the turning wheel (C) rotates and the contacting springs (C1, C2, C3, C4) rotate synchronously; in other words, the contacting springs (C1, C2, C3, C4) continuously frictionize and contact the copper ring planes (A1, A2, A3, A4) to communicate the plug wire (B) and the circuit signal of the earphone wire (D1).

However, after a long period of application, the prior art has the following shortcomings:

1. Since the soldered portions of the earphone wire (D1) and the input ends of the contacting springs (C1, C2, C3, C4) are weak, after the torsion generated by the turning wheel (C) rotated for a long time, the connection ends between the earphone wire (D1) and the contacting springs (C1, C2, C3, C4) might get loosened under force.
2. The contacting springs (C1, C2, C3, C4) repetitively frintionize the copper ring planes (A1, A2, A3, A4); that wears away both of them and finally results in undesirable connection or short circuit.

Therefore, how to completely eliminate the aforementioned shortcomings is the issue researched by the present invention.

SUMMARY OF THE INVENTION

The primary objective of present invention is to provide an earphone wire winding box with coaxial and dual wheels to have one wire designed as both the earphone wire and the plug wire to completely eliminate the conductive structure and never have any undesired connecting situation between them.

Another objective of the present invention is to provide an earphone wire winding box with coaxial and dual wheels by having two ends respectively used as an earphone communication wire and a plug communication wire; the said communication wires can coil around the axial planes of the coaxial shafts of different outer diameters; thereby when a long distance of the length of the earphone wire on the wheel plane of a longer diameter is pulled out, only a extremely short distance of the length of the plug wire on the wheel plane of a shorter diameter descends so as to achieve the application of using the same wire for both the earphone and the plug communication wires.

Yet another objective of the present invention is to provide an earphone wire winding box with coaxial and dual wheels, through the retaining device disposed on the surface of the outer case body, a mobile phone or its outer cover can be rapidly retained or detached.

To enable a further understanding of the structural features and the technical contents, the brief description of the drawings below is followed by the detailed description of the preferred embodiment.

BRIEF DESCRIPTION OF THE DRAWINGS

FIG. 19 is a pictorial and exploded drawing of the partial earphone wire winding box of a prior art.

FIG. 20 is a cross-sectional drawing of a prior art earphone wire winding box.

DETAILED DESCRIPTION OF THE PREFERRED EMBODIMENTS

Figure 1:
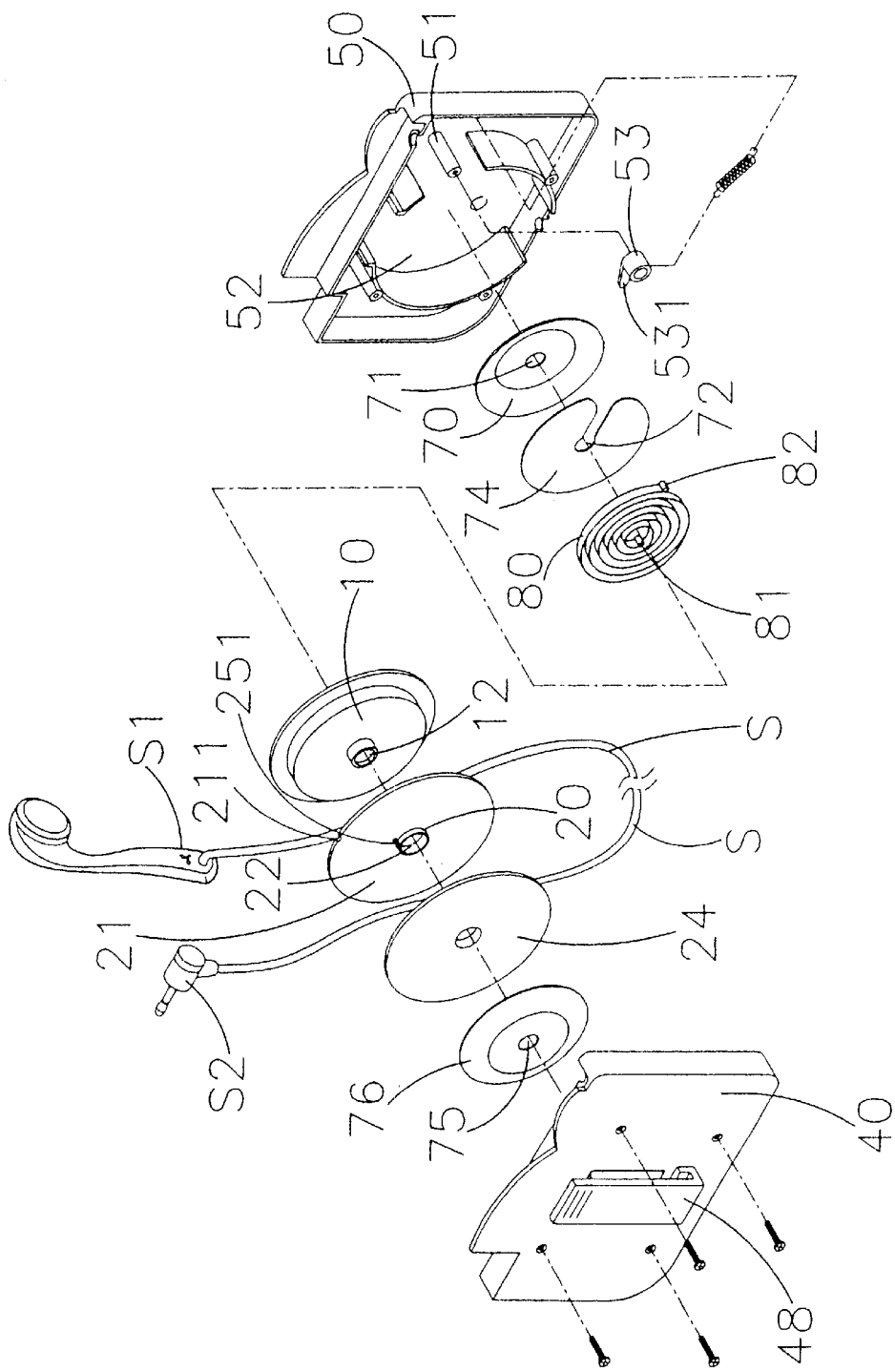
FIG. 1 is a pictorial and exploded drawing of the present invention.
Figure 2:
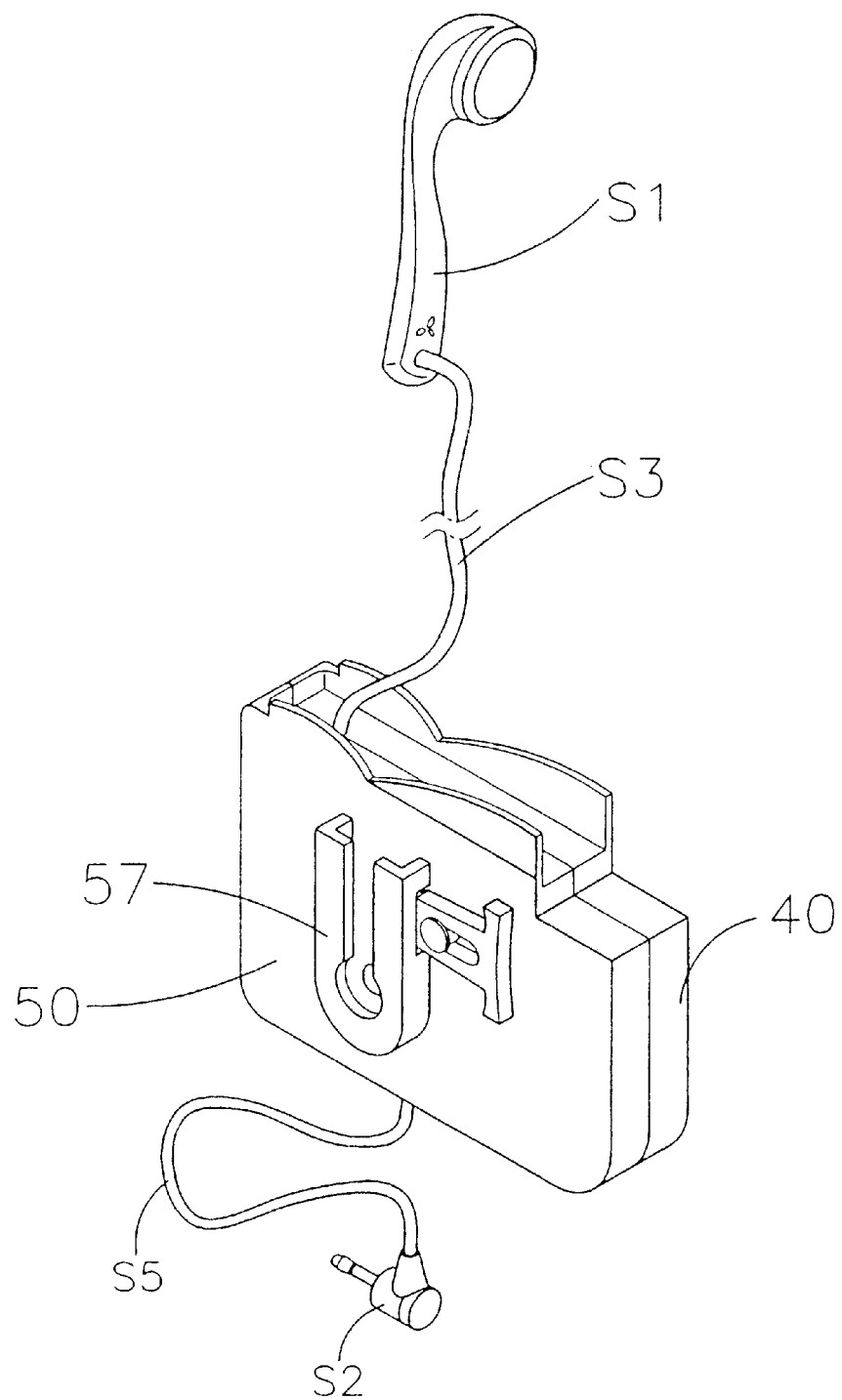
FIG. 2 is a pictorial and external view drawing of the present invention.

Referring to FIGS. 1–5, according to the structure, the present invention comprises a communication wire (S) with an earphone (S1) connected to one end and a plug (S2) connected to the other end; a big turning wheel (10) of a longer outer diameter and a small turning wheel (20) of a shorter outer diameter; both of the center holes (12, 22) thereof are respectively and lively jointed to an uni-axial portion (30); the wheel planes of the big and small turning wheels (10, 20) are respectively formed into storage grooves (15, 25) for the communication wire (S) to coil around therein; the communication wire (S) stored in storage grooves (15, 25) can be distinguished as an upper wire (S3) and a lower wire (S4); the bottom end (81) of a spiral spring (80) connects to the axial portion (30) and the outer end (82) thereof connects to the inwardly concaved wheel plane of the big turning wheel (10); thereby, when quite a length of the upper wire (S3) inside the storage groove (15) of the big turning wheel (10) is pulled out, the lower wire (S4) inside the storage groove (25) of the small turning wheel (20) descends only an extremely short distance.

According to the aforementioned primary features, wherein the axial portion (30) is unitarily molded inside an inner case body (40); the inner case body (40) and an outer case body (50) screwed together to accommodate the big and the small turning wheels (10, 20) therein; after joining into one unit, the upper and the lower ends of the inner and the outer case bodies (40, 50) form an upper and a lower guide holes (55, 45); the upper wire (S3) on the big turning wheel (10) can be guided outwardly from the upper guide hole (55) and the lower wire (S4) on the small turning wheel (20) can be guided outwardly from the lower guide hole (45).

According to the aforementioned primary and secondary features, wherein the outer lateral wall surface of the big turning wheel (10) is transversely disposed with an inconsecutive circular convex body (13); the inconsecutive end has a notch (131) and a positioning projecting block (132) is disposed on the circular plane; a brake body (53) with a positioning arm (531) is lively connected to a fixing pin (51) disposed against onto the inner wall plane of the outer case body (50); one end of a spring (54) is fixed onto an inner wall plane (52) of the outer case body (50) and the other end thereof is fixed at a proper position on the brake body (53) to make it a flexible element; when the big turning wheel (10) rotates, the positioning arm (531) chooses to position on a notch wall plane (133) of the notch (131) or on the lateral wall plane of the positioning projecting block (132).

According to the aforementioned primary and secondary features, wherein the structure of the storage groove (25) of the small turning wheel (20) has a small disk (24) lively engaged on the axial portion (30) and clamped to the lateral end rim of the wheel plane of the small turning wheel (20); a transverse bar (251) is disposed at a proper position on the outer groove wall (21) of the storage groove (25) adjacent to the wheel plane; thereby the communication wire (S) can be clamped in a clamp slot (252) formed between the transverse bar (251) and the wheel plane; the outer circumferential rim of the outer groove wall (21) is disposed with a concave groove (211) for the passage of the communication wire (S).

According to the aforementioned primary and secondary features, wherein a bowl-shaped body (70) with a through hole (71) and a bushing piece (74) with a through hole (72) are fixedly connected to the outer side of the axial portion (30) and press against the bushing piece (74) to enhance the rotary stability of the big wheel (10); wherein a bowl-shaped body (76) with a through hole (75) is inserted fixedly to the inner side of the axial portion (30) to push and connect lively to the lateral wall plane of the disk (24) so as to enhance the connection and synchronously rotary stability between the big and the small turning wheels (10, 20).

According to the aforementioned secondary features, wherein the rear wall plane of the inner case body (40) is disposed with a resilient retainer (48) to be retained to the human body.

Figure 12:
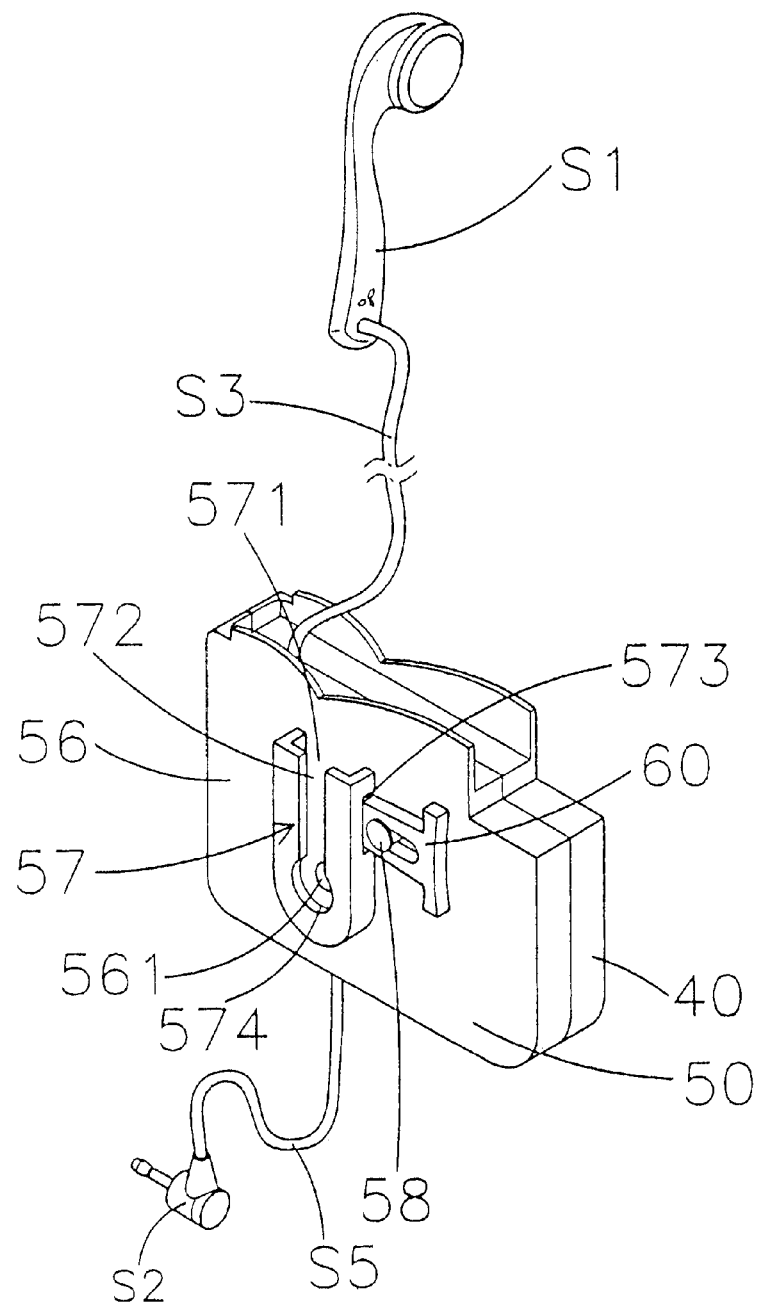
FIG. 12 is a pictorial and the rear view drawing of the present invention.
Figure 13:
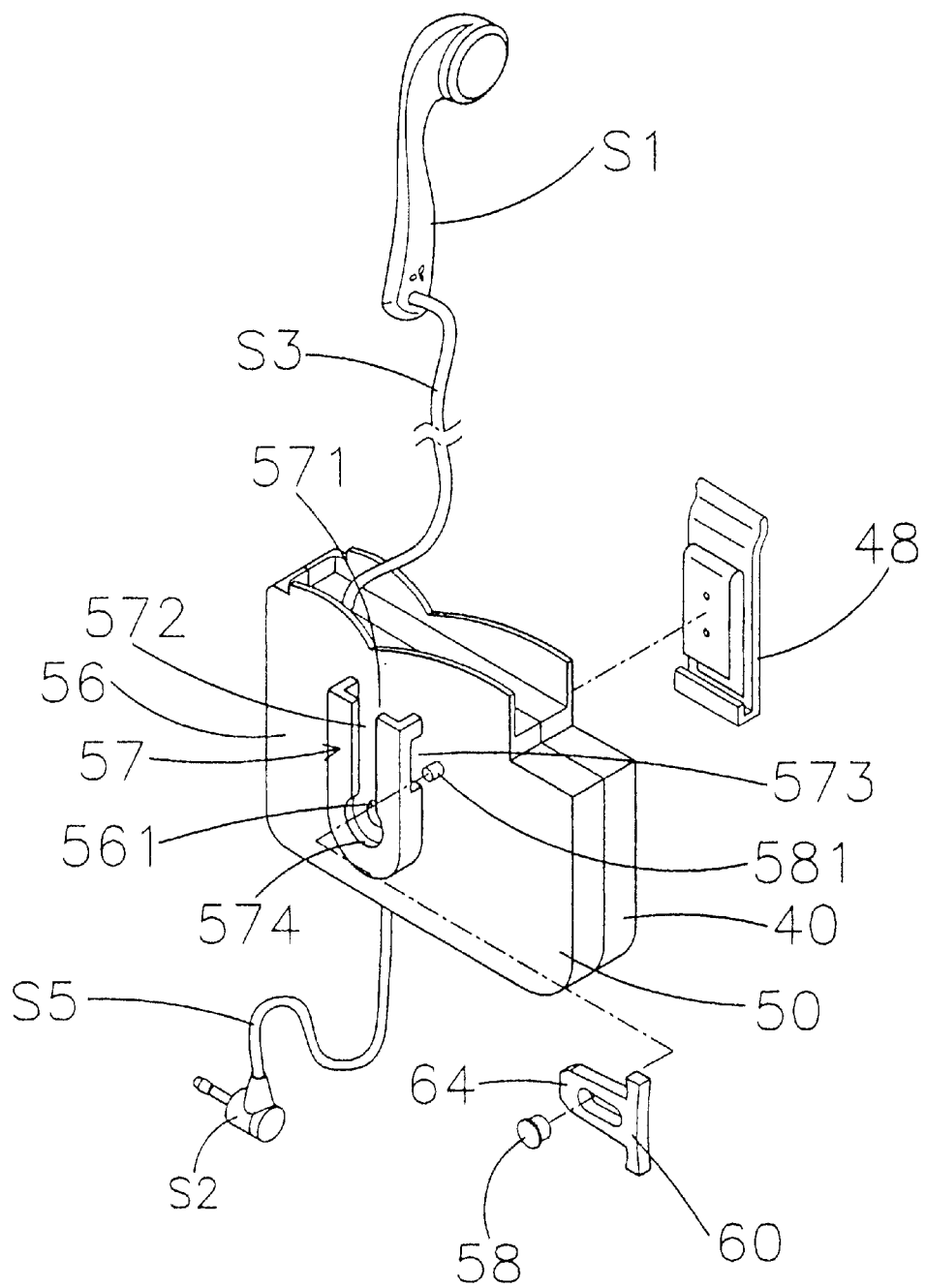
FIG. 13 is a pictorial and exploded drawing of the partial rear view of the present invention.
Figure 14:
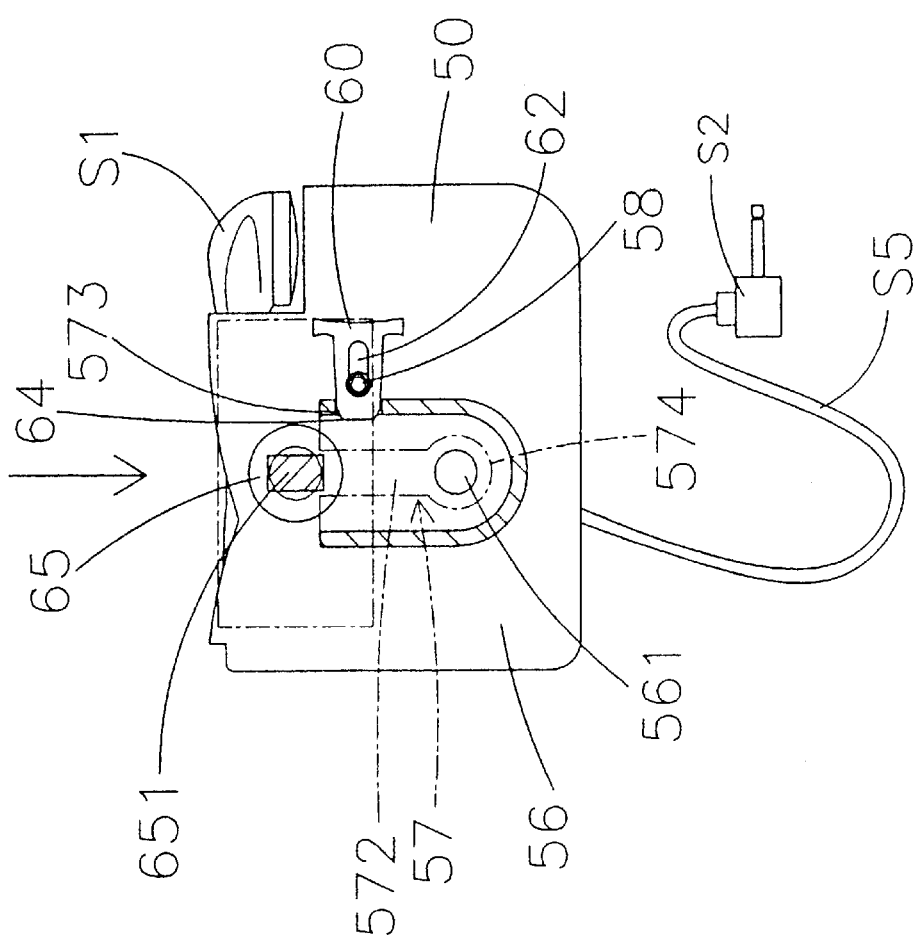
FIG. 14 is a plane drawing of the action before assembling the back cover of the mobile phone and the retaining device of the present invention.

According to the aforementioned primary features, wherein the rear wall plane (56) of the outer case body (50) is fixedly disposed with a retaining convex portion (57) with a retaining slot (571) and a slide receiving slot (572); wherein an insert hole (571) is disposed on the lateral wall plane of the retaining slot (571), as shown in FIGS. 12, 13 and 14; a convex outer post body (58) is fixedly jointed with or unitarily molded to a proper position on the rear wall plane (56) and adjacent to the lateral side of the insert hole (573); an insert plate (60) has a elongate through hole (62) disposed therein; the convex outer post body (58) can be inserted into the matched elongate through hole (62) and limited therein; at the mean time, a retaining end portion (64) of the insert plate (60) enters transversely into the retaining slot (571); a positioning column body (65) has a neck portion (651) to be slid into the slide receiving slot (572) for positioning and transversely blocking in the retaining slot (571) through retaining end portion (64) so as to eliminate the upwards displacement or fall of the column body (65) in the slide receiving slot (572) under the force from the opposite direction.

According to the aforementioned primary features, where the column body (65) can be fixedly jointed to the rear side of a back cover (87) of a mobile phone (86), or directly and fixedly jointed to the rear side of the battery (not shown in the Figure) of the mobile phone (86); the front plane of the said column body (65) is disposed with a concave slot (66); wherein the bottom portion of the slide receiving slot (572) of the retaining convex portion (57) further has an arcurate hole (574); the rear wall plane (56) corresponding to the arcurate hole (574) is disposed with a flexible press-against convex portion (561); when the column body (65) slides from the upper end of the retaining slot (571) into the bottom portion for positioning, the press-against convex portion (561) fitly and correspondingly presses against into the concave slot (66) to make the column body (65) obtain the initial position.

Figure 18:
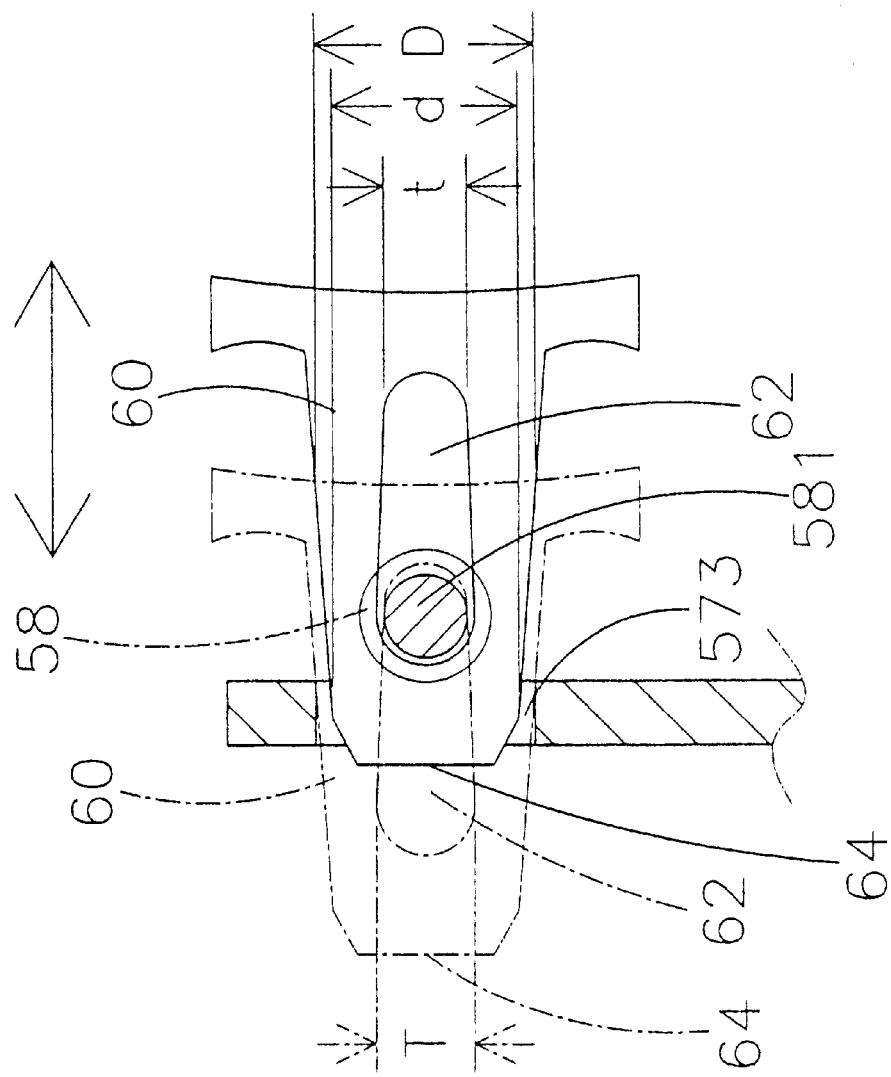
FIG. 18 is a plane and schematic drawing of the action of the insert plate of the present invention.

According to the aforementioned primary features, wherein the retaining end portion (64) at the front end of the insert plate (60) has a shorter outer diameter (d), as shown in FIG. 18; sequentially, it extends rearwards to a longer outer diameter (D) to form inclined side; the front rim of the inner hole of the elongate through hole (62) has longer inner diameter (T) that sequentially extends rearwards to form a shorter inner diameter (t); when the insert plate (60) inserts transversely into the insert hole (573) of the retaining convex portion (57), it makes the inclined side of the insert plate (60) further tightly fit with the hole wall plane of the insert hole (573) and makes the convex outer post body (58) further retain tightly with the hole wall of the elongate through hole (62).

Figure 4:
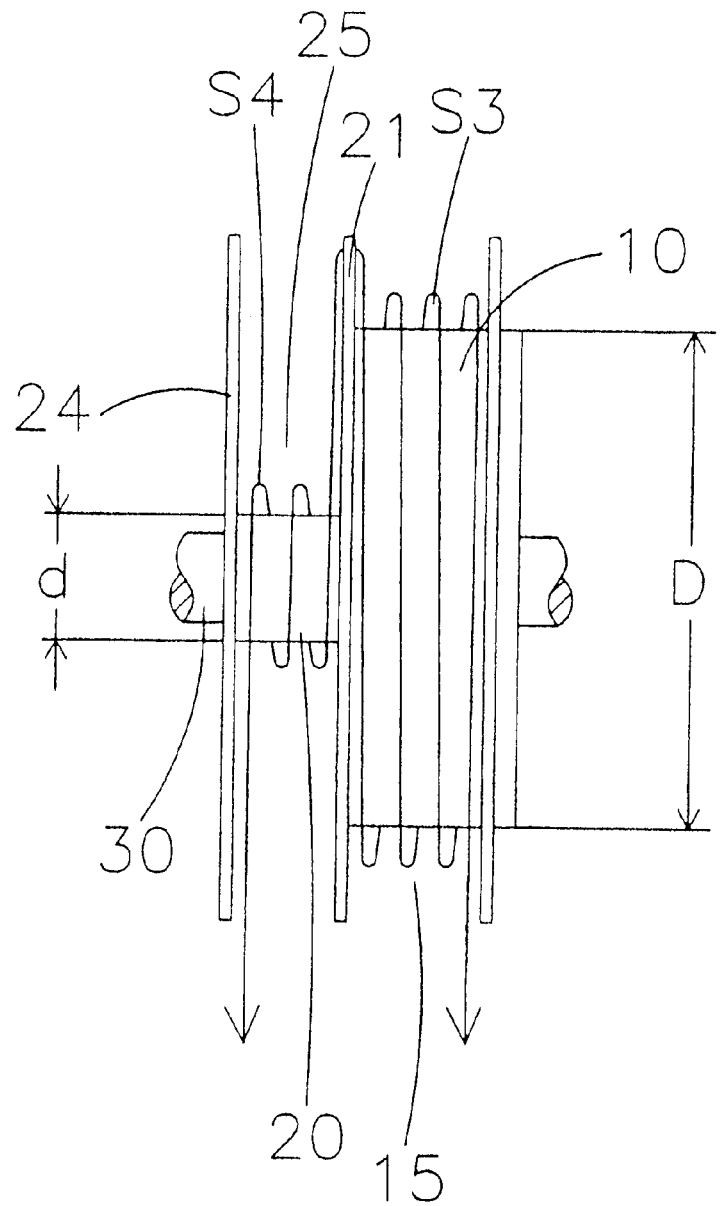
FIG. 4 is a plane drawing of the lateral view of the displacement of the communication wire on the big and small wheel planes of the present invention.

According to achievement of the primary and the secondary features, the present invention possesses the following superior efficacy and embodiment in application:

1. Referring to FIG. 4 of the primary features of the present invention, both of the big and the small turning wheels (10, 20) are lively jointed onto the same axial portion (30); therefore, when the big turning wheel (10) rotates once, the small turning wheel (20) also rotates once; as the big turning wheel (10) rotates once, the length of the upper wire (S3) outwardly extended or rewound in the storage groove (15) is $\pi \times D$ (D is the diameter of the big turning wheel (10)); as the same, as the small turning wheel (20) rotates one, the length of the lower wire (S4) released or rewound in the storage groove (25) is π×d (d is the diameter of the small turning wheel (20)); the wire length ratio between the wound wires (released wires) of them equals to the diameter ratio between the big and the small turning wheels (10, 20); if the earphone (S1) is pulled outwardly by the user to make the upper wire (S3) release upwardly, then the lower wire (S4) attached by the microphone (S1) of the earphone descends; if the upper wire (S3) is pulled in 50 cm for inserting the earphone (S1) into the ear, at the same time, the lower wire (S4) is released outside the storage groove (25) in 8.3 cm outside the lower guide hole (45); the released 8.3 cm lower wire (S4) does not obstacle any movement around the human waist and is acceptable during application.

Figure 3:
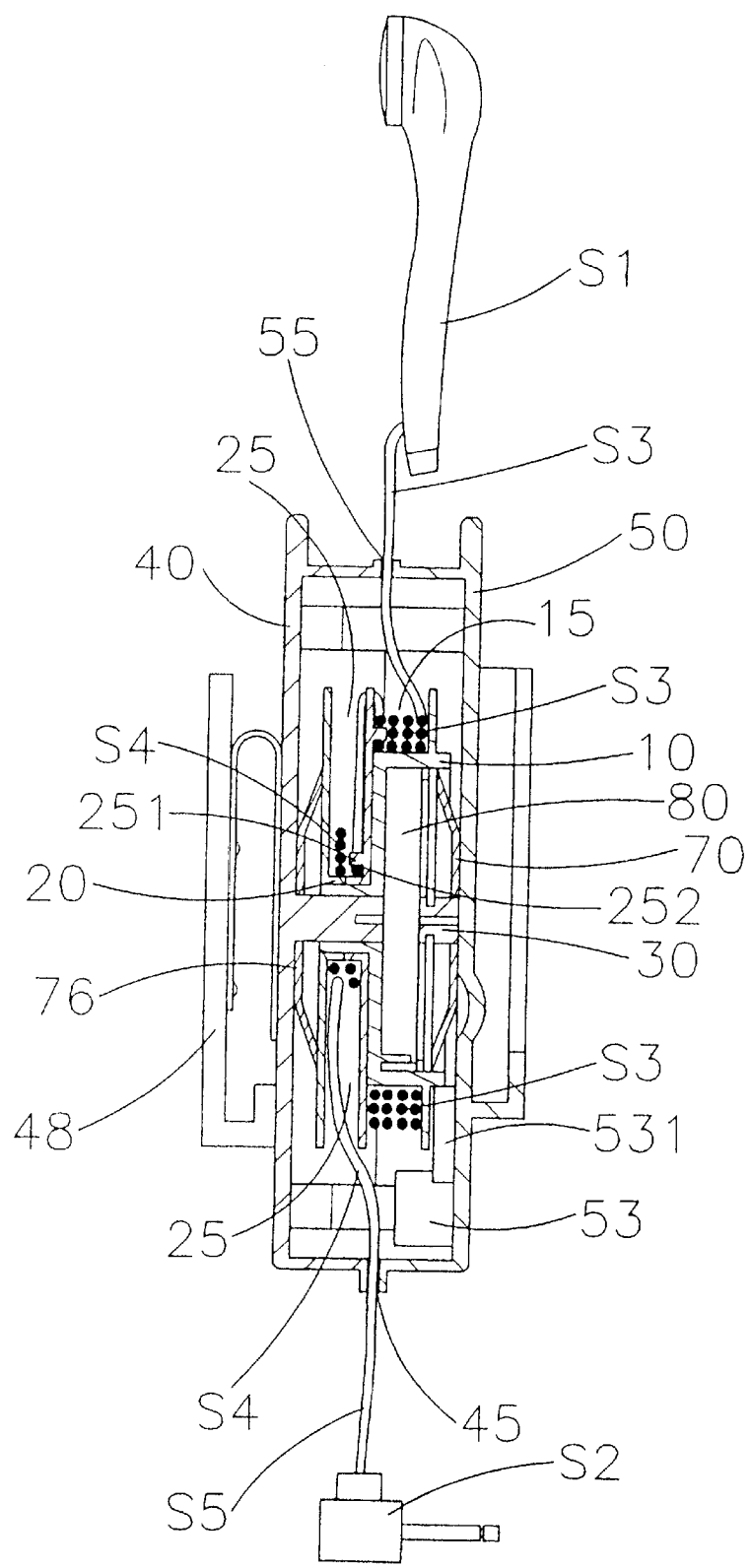
FIG. 3 is a longitudinal and cross-sectional drawing of the present invention.

2. Referring to FIGS. 1 and 3, the communication wire (S) is positioned and spaced in a proper distance inside the clamp slot (252), to distinguish the communication wire (S) as the upper wire (S3) and the lower wire (S4); the length of the upper wire (S3) is longer while that of the lower wire (S4) is shorter; in a preferred embodiment, the length ratio between the upper and the lower wires (S3, S4) is 6:1; the upper wire (S3) is wound in the storage groove (15) while the lower wire (S4) is stored inside the storage groove (25); the upper and the lower wires (S3, S4) respectively penetrate through the guide holes (55, 45); wherein the upper wire (S3) extends from the concave slot (211) into the storage groove (25); the resilient retainer (48) retains onto the human waist; at the mean time, the plug (S2) is plugged to the mobile phone (86); when the user pulls out the earphone (S1) upwardly, the spring tensions, the big and the small turning wheel (10, 20) rotate based on the fixed and immovable axial portion (30) as the axial center; to design the big and small turning wheels (10, 20) to have different diameters (D, d) makes the length of released upper wire (S3) far longer than the length of the released lower wire (S4); the greater the diameter ratio value between the big and the small turning wheels (10, 20) is, the shorter the released lower wire (S4) will be.

Figure 5:
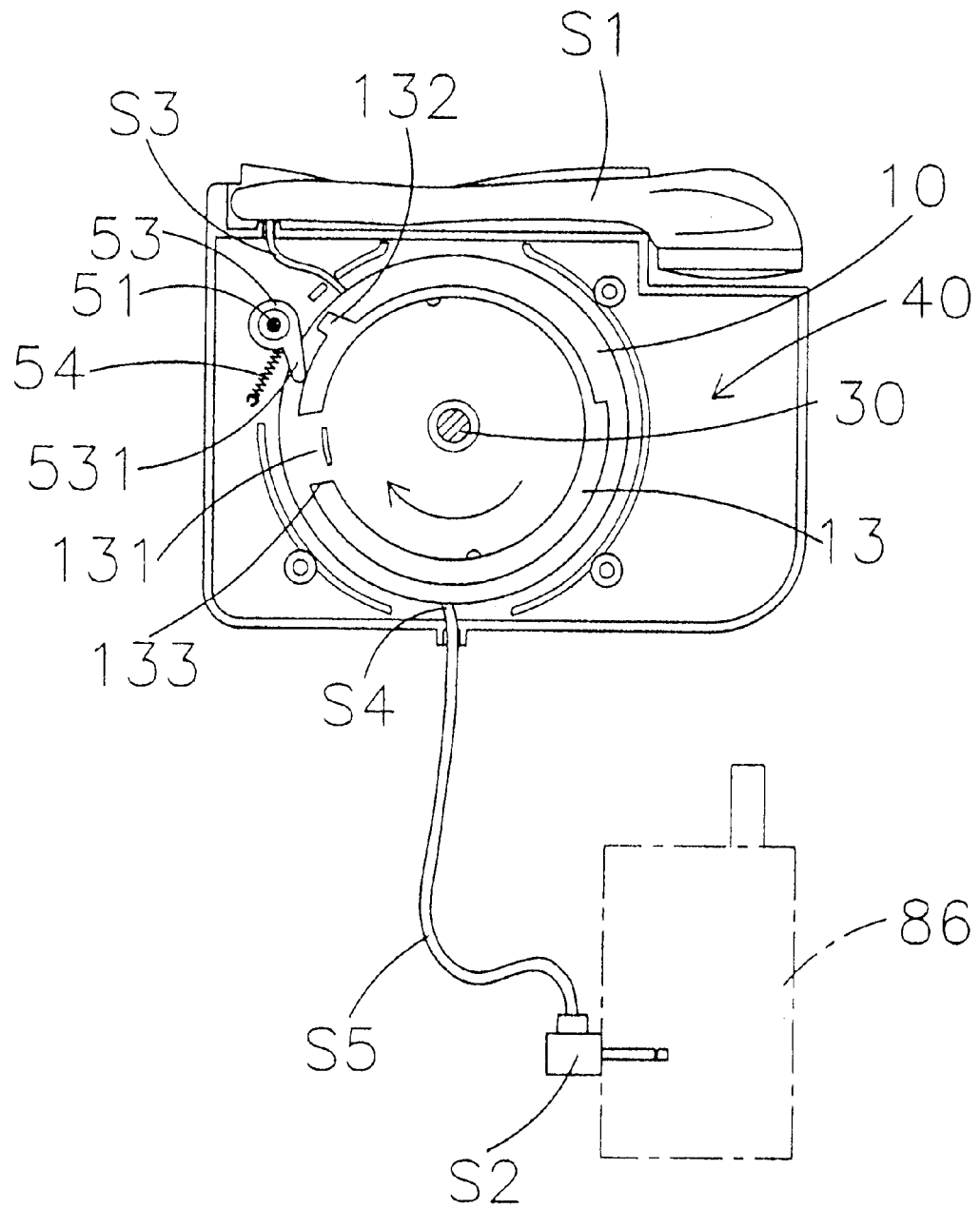
FIG. 5 is the first drawing of the clockwise rotation of the big turning wheel in pulling the wire of the present invention.
Figure 6:
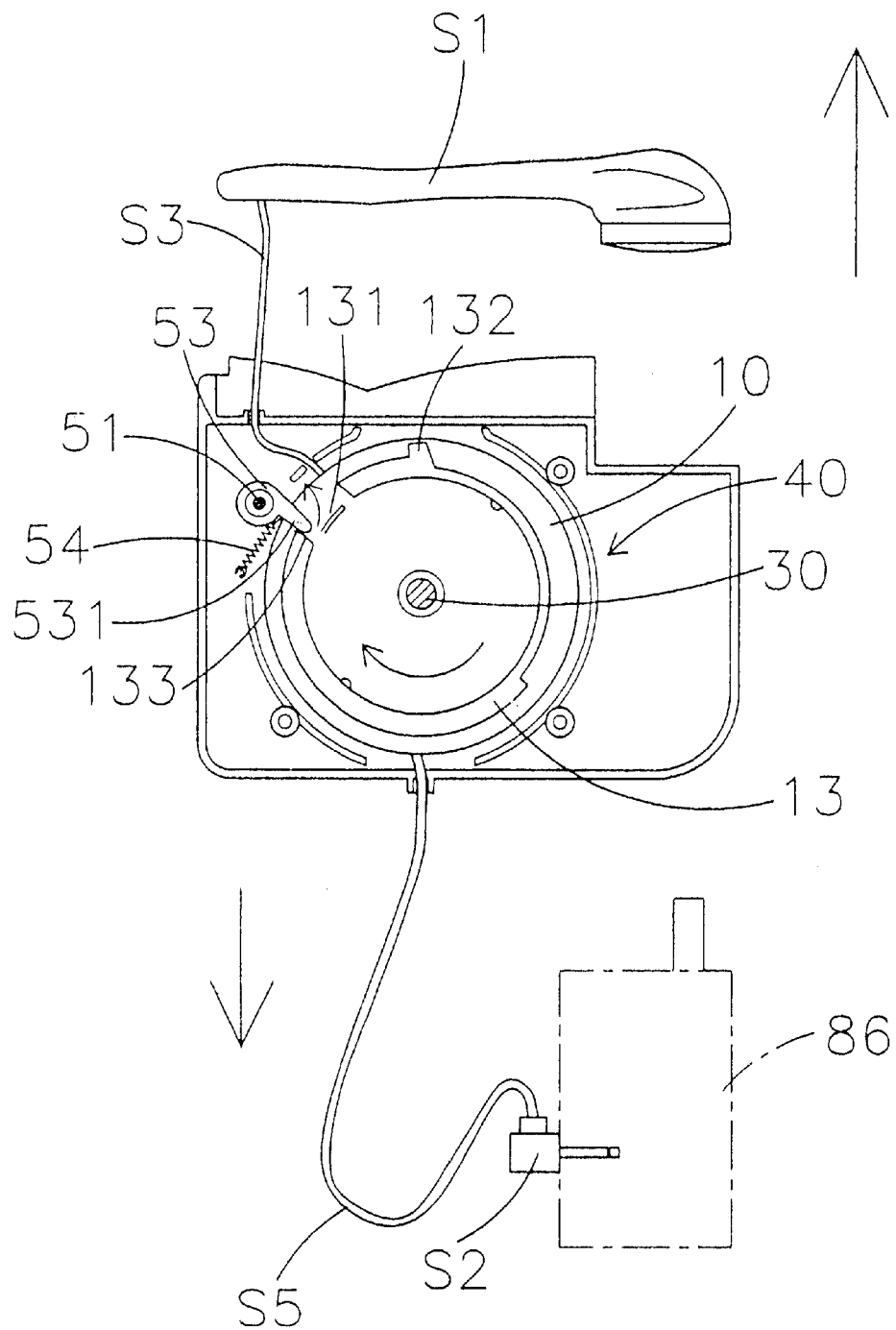
FIG. 6 is the second drawing of the action in FIG. 5.
Figure 7:
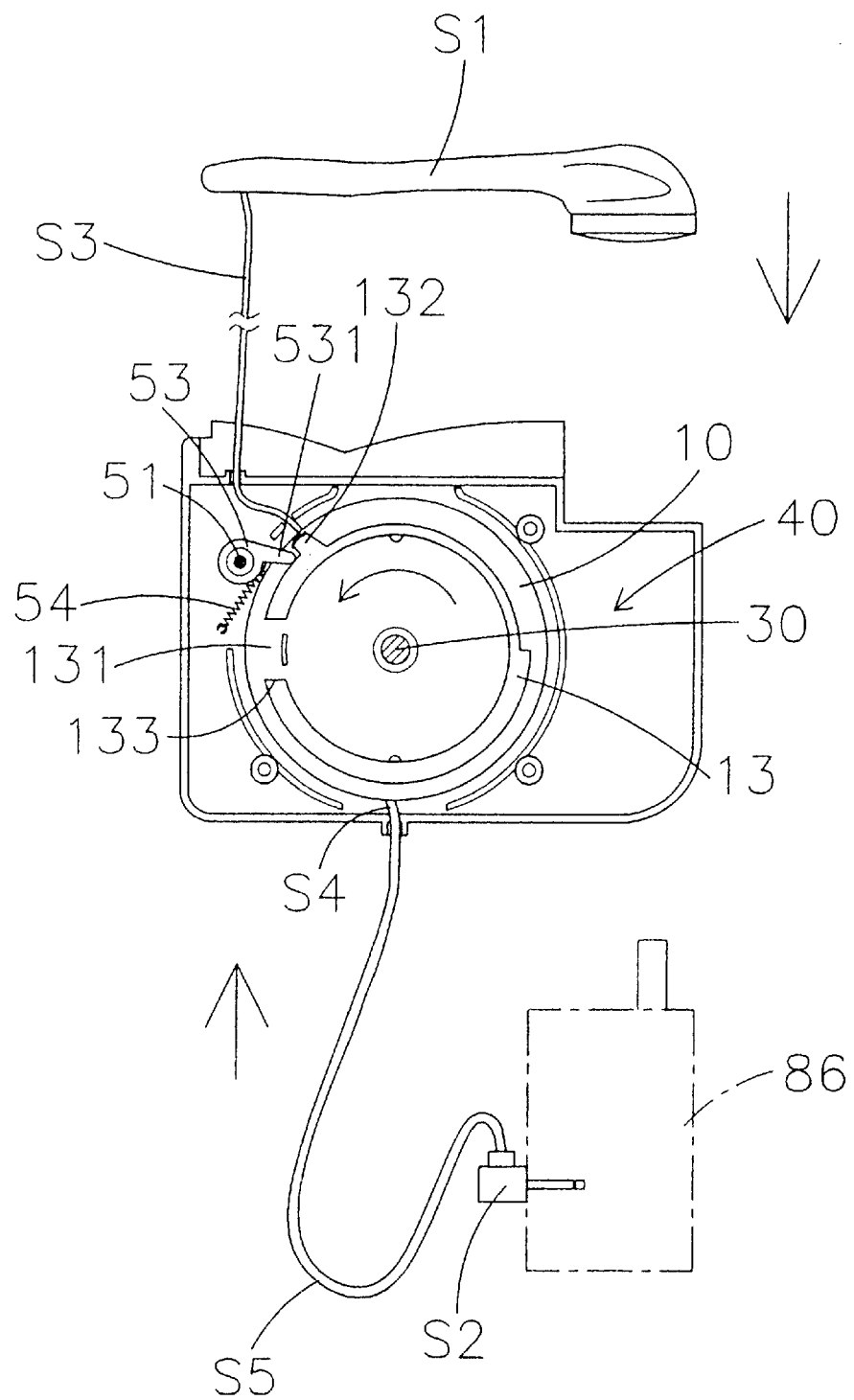
FIG. 7 is a plane drawing of the brake state of the big turning wheel of the present invention.
Figure 8:
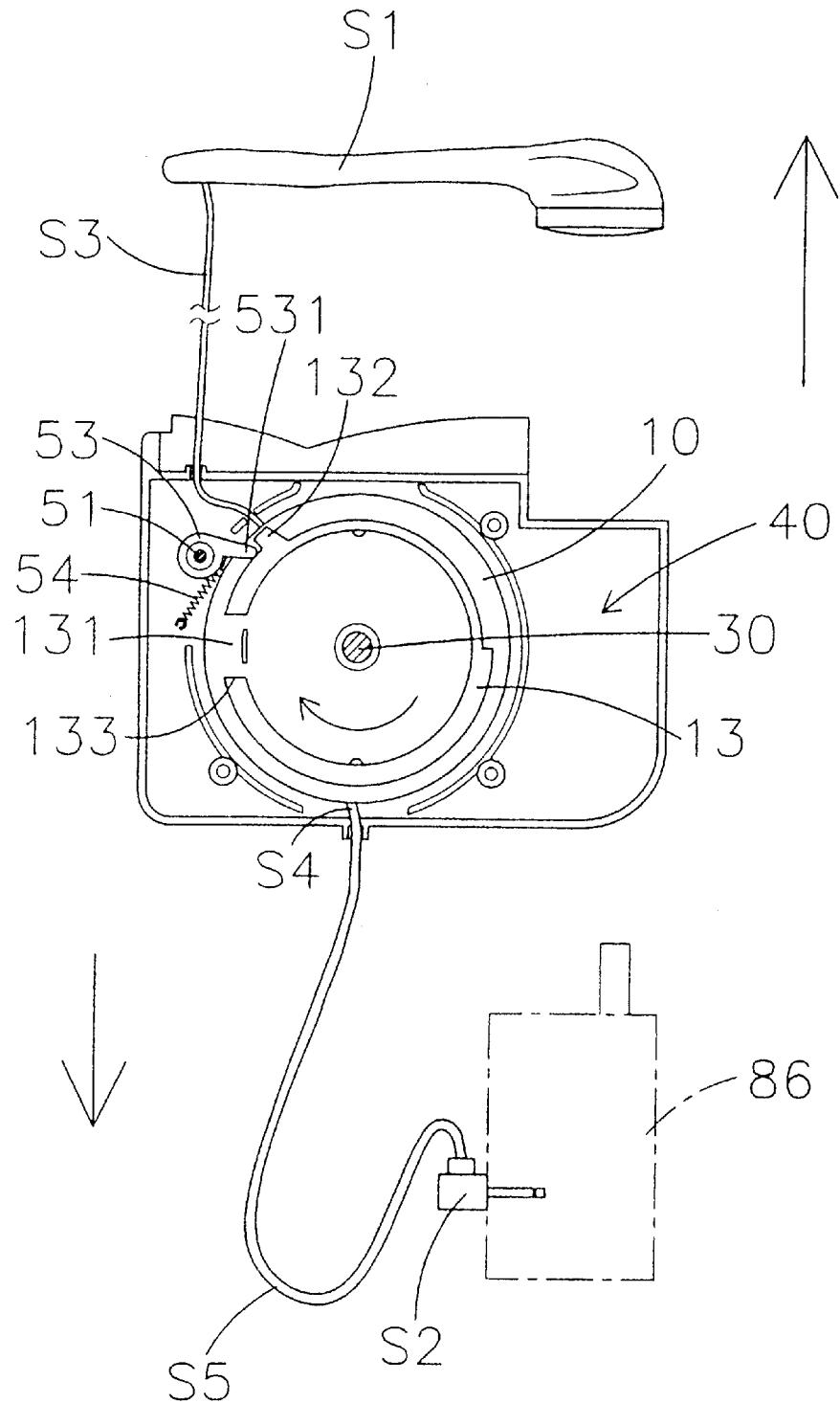
FIG. 8 is the first schematic and plane drawing of the clockwise rotary movement of the big turning wheel of the present invention.
Figure 9:
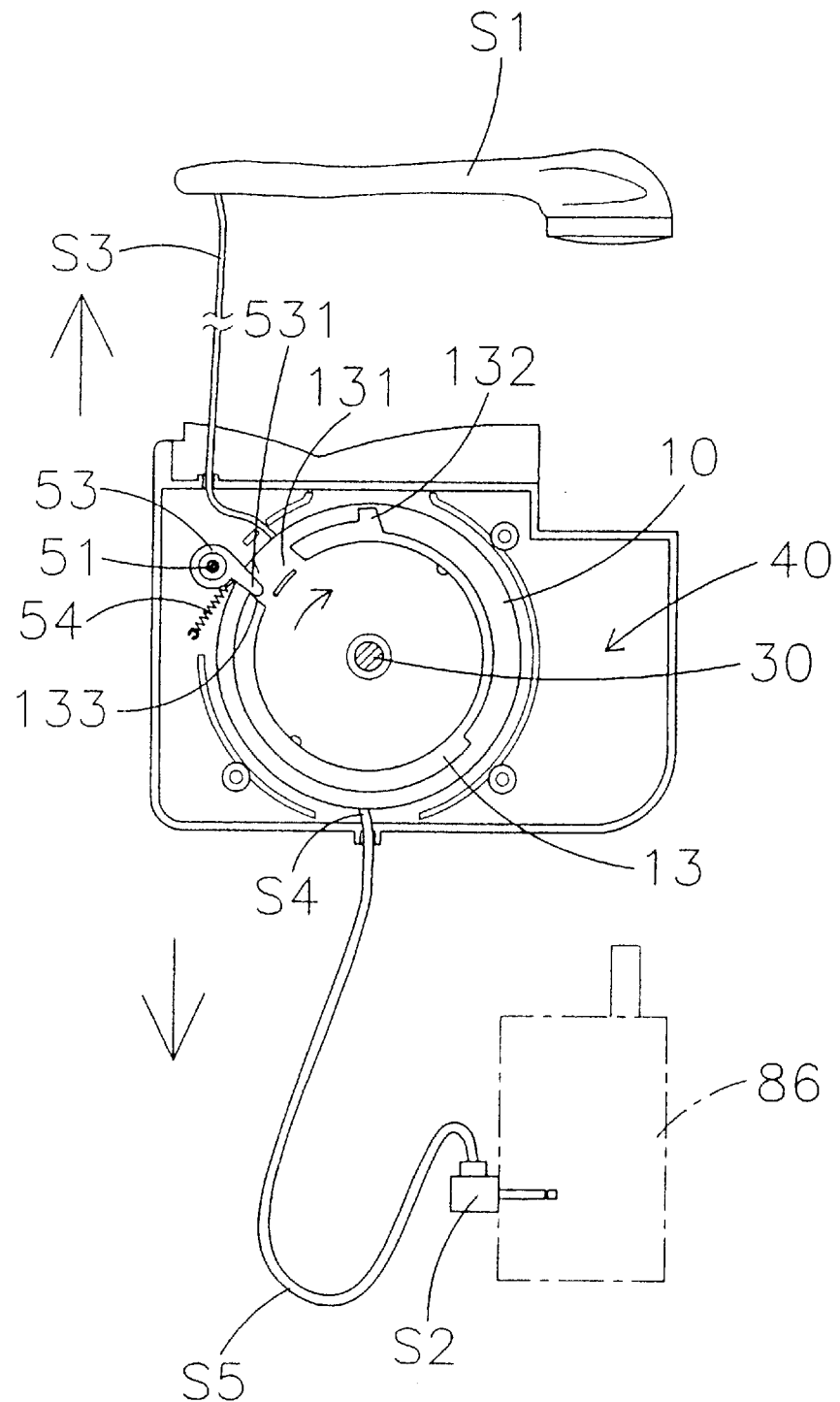
FIG. 9 is the second schematic and plane drawing of the clockwise rotary movement of the big turning wheel of the present invention.
Figure 10:
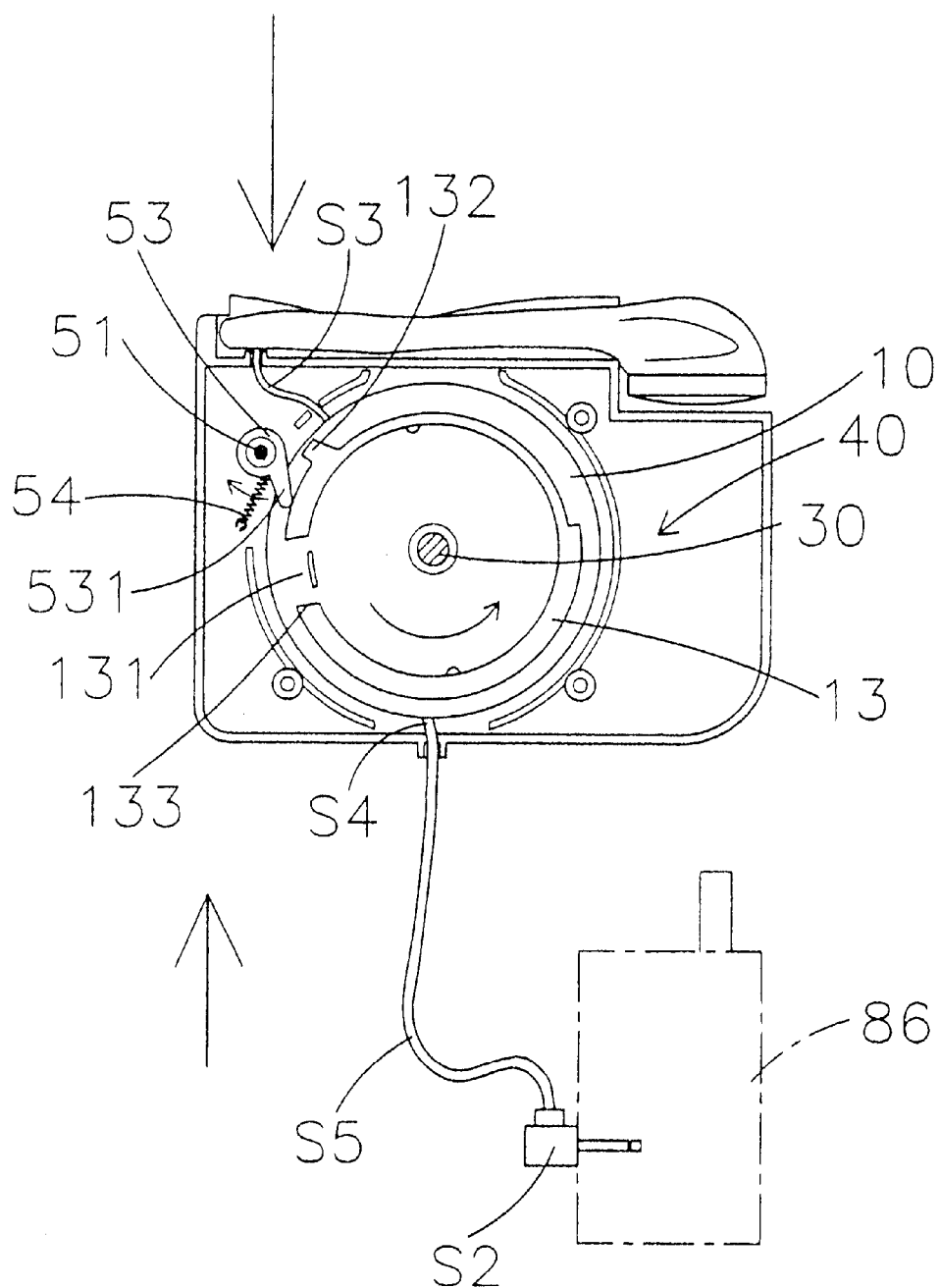
FIG. 10 is the drawing of the clockwise rotary movement of the big turning wheel in rewinding the wire of the present invention.
Figure 11:
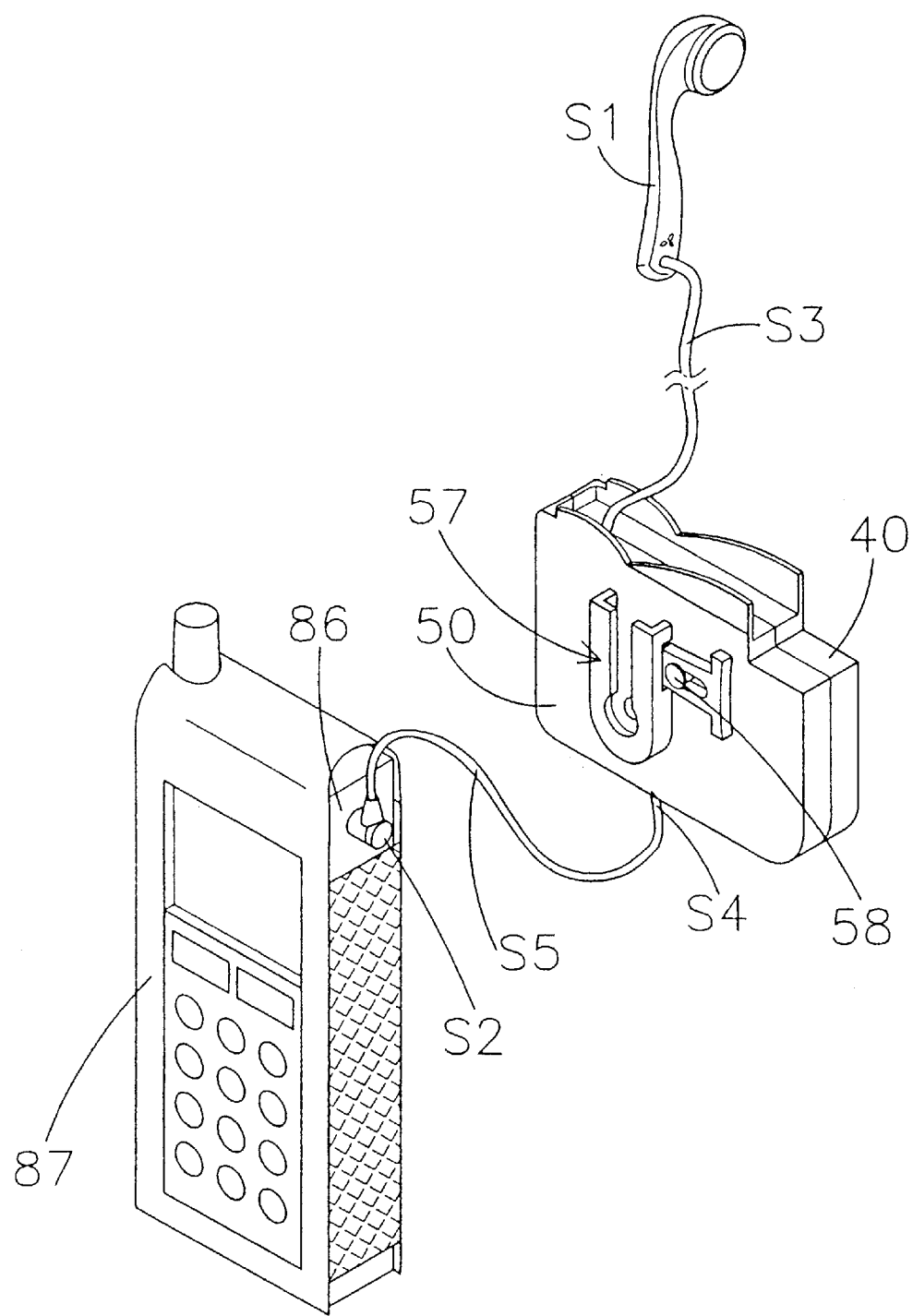
FIG. 11 is a pictorial drawing of the connection between a mobile phone and the present invention.

3. Referring to FIGS. 5 and 6, when the upper wire (S3) is pulled upwardly, both of the big and the small turning wheels (10, 20) rotates clockwise; meantime, the circular convex body (13) synchronously rotates with the big turning wheel (10); the end portion of the positioning arm (531) inclines angularly and downwardly to attach onto the circular plane of the circular convex body (13); when the positioning arm (531) runs into the notch (131) and is touched by the force of the notch wall plane (133), the positioning arm (531) uses the fixed fixing pin (51) as the turning axel to bias resiliently and upwardly (outwardly), as shown in FIG. 6); thereby the circular convex body (13) rotating clockwise will not be limited to brake; as the same, the positioning arm (531) uses the fixing pin (51) as the rotating center to bias outwardly to drive the circular convex body (13) to rotate clockwise without being limited to brake. Referring to FIG. 3 & FIG. 7, when the upper wire (S3) stop the movement of being pulling upwardly and the pulling force is released, the contracting function of the spiral spring (80) makes the big and the small turning wheels (10, 20) immediately rotate counterclockwise; since the positioning arm (531) is angled outwardly and has a longer length, the end portion of it is retains against to a proper circular plane at the front end of the inner lateral wall of the positioning convex block (132) to achieve the braking (temporary positioning) efficacy, as shown in FIG. 7; the positioning convex block can further eliminate the pressing and blocking function of the over displacement of the positioning arm (531); when rewinding the wire, referring to FIG. 3 & FIG. 8, first the user slightly pulls the upper wire (S3) upwardly in a short distance to make the big and the small turning wheels (10, 20) rotate clockwise and to make the positioning arm (531) run into the notch (131), as shown in FIG. 9; at the same time, the positioning arm (531) slightly inclines and the rewinding action stops; when the pulling force is released, the circular convex body (13), under the contracting force of the spiral spring (80), rotates counterclockwise; as shown in FIG. 10, when the circular convex body (13) rotates counterclockwise, the positioning arm (531) bias inwardly and reversely at a larger inclined angle downwardly to make the positioning arm (531) situated on the circular plane of the circular convex body (13) slide oppositely; at the mean time, the positioning arm (531) has no any retaining and braking effect even it contacts the positioning block (132); thereby, the upper and the lower wires (S3, S4) can be smoothly rewound into two storage grooves (15, 25); what has to be mentioned is that there is a segment of bottom wire (S5) in a short distance of the lower wire (S4) preserved for inserting to the mobile phone (86), therefore the exposed bottom wire (S5) will not be collected into the storage groove (25); FIG. 11 shows the pictorial drawing of the insertion between the present invention and the mobile phone.

4. Referring to FIGS. 1 and 3, the bowl-shaped bodies (70, 76) do not rotate with the big and the small turning wheels (10, 20); the outer sides thereof press against the inner wall plane of the inner and the outer case bodies (40, 50), the inner side thereof respectively presses against the big and the small turning wheels (10, 20); through this pressing-against function, the big and the small turning wheels (10, 20) can rotate quite stably at the axial portion (30); furthermore, since the bowl-shaped body (70) presses the bushing piece (74) and the bushing piece (74) presses the spiral spring (80), the bowl-shaped body (70) not only has the function of pressing against the big turning wheel (10), it also has the efficacy of preventing the spiral spring (80) from displacement.

Figure 15:
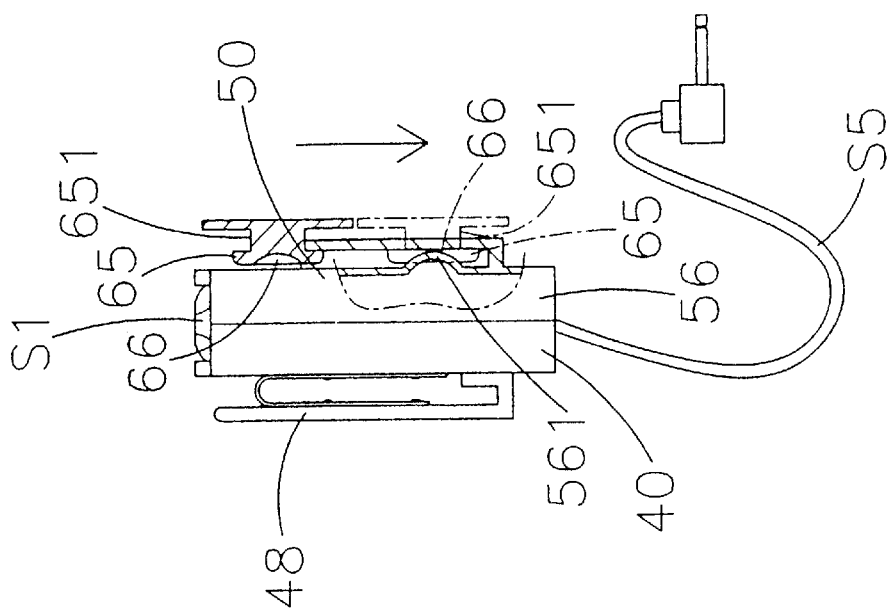
FIG. 15 is a lateral drawing of the action before assembling the back cover of the mobile phone and the retaining device of the present invention.

5. Referring to FIGS. 11 to 14, the insert plate (60) is lively jointed to the rear wall plane (56) through the convex outer post body (58); when the column body (65) slides in from the retaining slot (571), the neck portion (651) thereof slides downwardly into the slot bottom portion from the slide receiving slot (572); at the mean time, the sliding column body (65) touches the flexible and resilient press-against convex portion (561) to make it deform resiliently and rearwards; after the column body (65) slides to the bottom of the retaining slot (571) and positions, the press-against convex portion (561) enters the concave slot (66) correspondingly to make the column body (65) be positioned initially on the inner hole wall of the arcurate hole (574), as shown in FIG. 15; in addition, the convex outer post body (58) is sleeved and engaged onto an inner post body (581).

Figure 16:
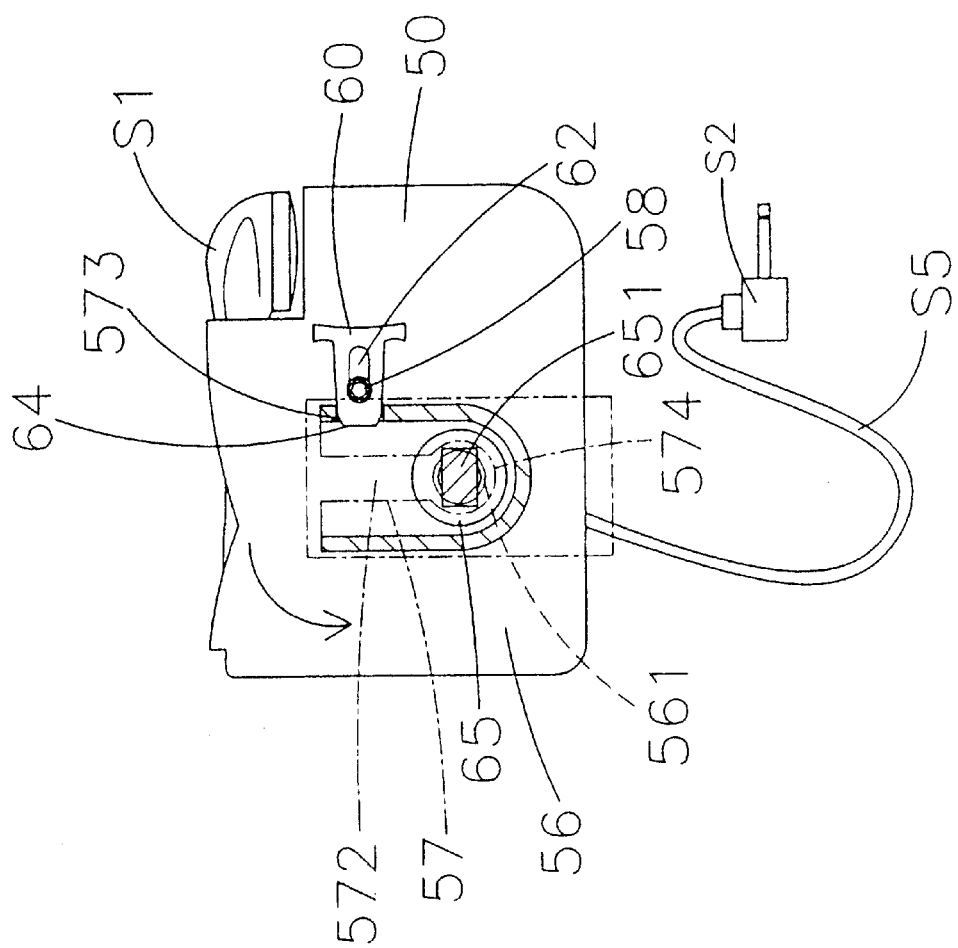
FIG. 16 is a plane drawing of the action after assembling the back cover of the mobile phone and the retaining device of the present invention.
Figure 17:
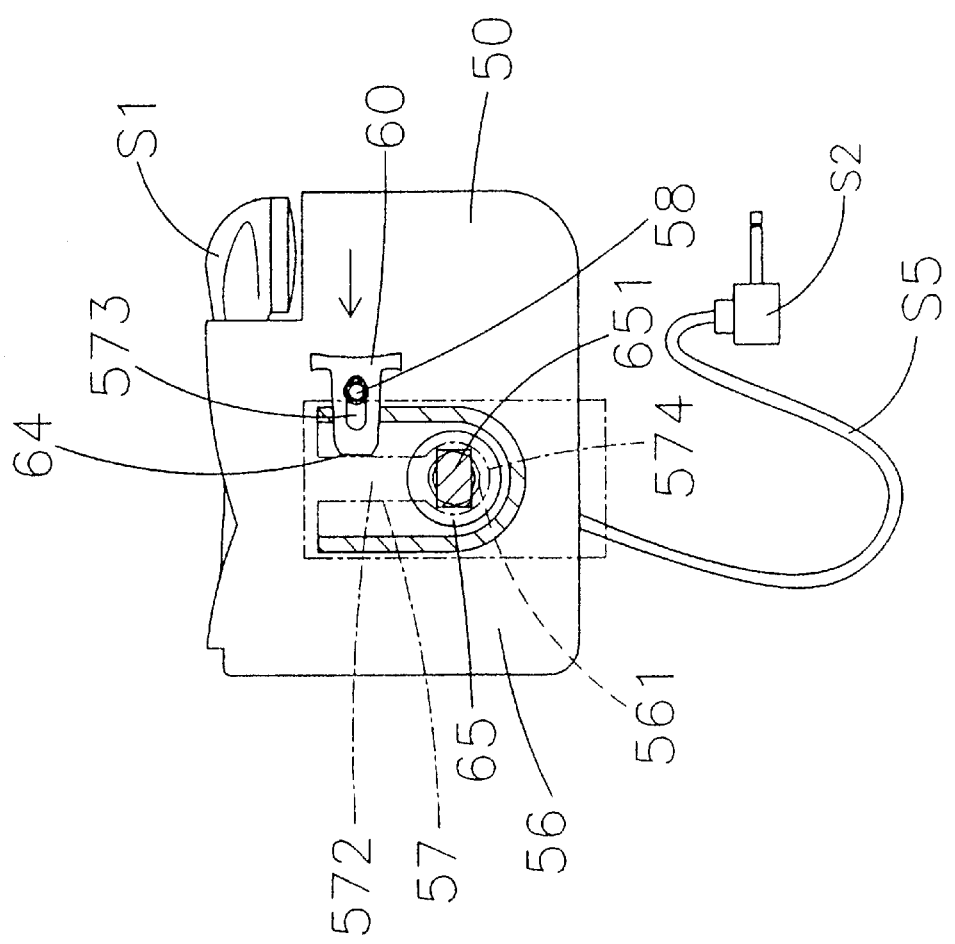
FIG. 17 is plane drawing of the action after assembling the back cover of the mobile phone and the retaining device of the present invention.

6. Referring to FIGS. 16, 17 and 18, a finger is used to push the insert plate (60) transversely into the slide receiving slot (572); at the mean time, since the outer diameter (d) of the retaining end portion (64) is shorter then the inner diameter of the insert hole (573), it is very easy to slide the retaining end portion (64) into the slide receiving slot (572); however, since the outer diameter (D) of the rear segment of the retaining end portion (64) is longer than the inner diameter of the insert hole (573), a tightly match is formed thereby, as shown in FIG. 18, to position the insert plate (60) in the insert hole (573); furthermore, when the retaining end portion (64) slides into the retaining slot (571), the elongate through hole (62) uses the convex outer post body (58) as the positioning center to make opposite forward and backward displacements; since the front rim of the inner hole of the elongate through hole (62) has a longer inner diameter (T) and the rear rim of the inner hole thereof has a shorter inner diameter (t), when the retaining end portion (64) tightly fits and retains inside the insert hole (573), since inner diameter (t) of the hole rim of the elongate through hole (62) is shorter than the longest outer diameter of the convex outer post body (58), thereby the convex outer post body (58) tightly fits and retains on the rear hole rim wall of the elongate through hole (62); therefore, after the retaining end portion (64) transversely slides into the retaining slot (571), the insert plate (60) is positioned onto the retaining convex portion (57); meantime, the efficacy of having the retaining end portion (64) transversely blocking inside the retaining slot (571) to prevent the column body (65) from reversely sliding outside the retaining slot (571) under other force is achieved; therefore, no matter the column body (65) is retained fixedly to the back cover (87) of a hand phone or onto the mobile phone (86), when the column body (65) is clamped and retained onto the back clamp of the present invention, it can always eliminate the worry of having the column body (65) sliding outside under the reversely squeezing force of the human waist muscle.

7. When trying to take out the column body (65) from the retaining convex portion (57) on the rear wall plane (56), it is only necessary to use the finger to exert reverse force toward the insert plate (60), the retaining fit between the retaining end portion (64) of the insert plate (60) and the insert hole (573) will disappear to push the retaining end portion (64) backwards so that it withdraws from the retaining slot (571); at the same time, the retaining state of the convex outer post body (58) situated on the inner wall of the longer diameter (D) of the elongate through hole (62) also disappears; therefore, the column body (65) can be easily taken out from the retaining slot (571) and thereby the back cover (87) of the mobile phone (86) can be easily removed, as shown in FIGS. 14 and 15.

8. Referring to FIG. 18, since the insert plate (60) of the present invention can use the convex outer post body (58) as the center to displace back and forth to force the retaining end portion (64) easily move in and out the retaining slot (571), it can efficiently prevent the column body (65) from being forced to move outside the retaining slot (571).

In summation of the abovementioned, the features of the present invention is capable of specifically eliminating the use of two communication wires (the earphone wire and the plug wire) and the printed circuit board for conducting communication. However, it is of course to be understood that the embodiment described herein is merely illustrative of the principles of the invention and that a wide variety of modifications thereto may be effected by persons skilled in the art without departing from the spirit and scope of the invention as set forth in the following claims.

I claim:

1. An earphone wire winding box with coaxial and dual wheels, its structural features comprises:

a communication wire with an earphone connected to one end and a plug connected to the other end;

a big turning wheel of a longer outer diameter and a small turning wheel of a shorter outer diameter; both of the center holes thereof are respectively and lively jointed to an uni-axial portion; the wheel planes of the big and small turning wheels are respectively formed into storage grooves for the communication wire to coil around therein; the communication wire stored in storage grooves can be distinguished as an upper wire and a lower wire;

a spiral spring with its bottom end connected to the axial portion and the outer end thereof connects to the inwardly concaved wheel plane of the big turning wheel; thereby, when quite a length of the upper wire inside the storage groove of the big turning wheel is pulled out, the lower wire inside the storage groove of the small turning wheel descends only an extremely short distance.

2. An earphone wire winding box with coaxial and dual wheels according to claim 1, wherein the axial portion is unitarily molded inside an inner case body; the inner case body and an outer case body screwed together to accommodate the big and the small turning wheels therein; after jointing into one unit, the upper and the lower ends of the inner and the outer case bodies form an upper and a lower guide holes; the upper wire on the big turning wheel can be guided outwardly from the upper guide hole and the lower wire on the small turning wheel can be guided outwardly from the lower guide hole.

3. An earphone wire winding box with coaxial and dual wheels according to claim 2, wherein the outer lateral wall surface of the big turning wheel is transversely disposed with an inconsecutive circular convex body; the end of the inconsecutive circular convex body has a notch and a positioning projecting block is disposed on the circular plane; a brake body with a positioning arm is lively connected to a fixing pin disposed against onto the inner wall plane of the outer case body; one end of a spring is fixed onto the inner wall plane of the outer case body and the other end thereof is fixed at a proper position on the brake body to make it a flexible element; when the big turning wheel rotates, the positioning arm chooses to position on the notch wall plane of the notch or on the lateral wall plane of the positioning projecting block.

4. An earphone wire winding box with coaxial and dual wheels according to claim 2, wherein the rear wall plane of the inner case body is disposed with a resilient retainer to be retained to the human body.

5. An earphone wire winding box with coaxial and dual wheels according to claim 2, wherein the rear wall plane of the outer case body is fixedly disposed with a retaining convex portion with a retaining slot and a slide receiving slot; wherein an insert hole is disposed on the lateral wall plane of the retaining slot; a convex outer post body is fixedly jointed with or unitarily molded to a proper position on the rear wall plane and adjacent to the lateral side of the insert hole; an insert plate has an elongate through hole disposed therein; the convex outer post body can be inserted into the matched elongate through hole and limited therein; at the mean time, a retaining end portion of the insert plate enters transversely into the retaining slot; a positioning column body has a neck portion to be slid into the slide receiving slot for positioning and transversely blocked in the retaining slot through retaining end portion so as to eliminate the upwards displacement or fall of the column body in the slide receiving slot under the force from the opposite direction.

6. An earphone wire winding box with coaxial and dual wheels according to claim 5, where the column body can be fixedly jointed to the rear side of a back cover of a mobile phone, or directly and fixedly jointed to the rear side of the battery of the mobile phone; the front plane of the said column body is disposed with a concave slot; wherein the bottom portion of the slide receiving slot of the retaining convex portion further has an arcurate hole; the rear wall plane corresponding to the arcurate hole is disposed with a flexible press-against convex portion; when the column body slides from the upper end of the retaining slot into the bottom portion for positioning, the press-against convex portion fitly and correspondingly presses against into the concave slot to make the column body obtain the initial position.

7. An earphone wire winding box with coaxial and dual wheels according to claim 5, wherein the retaining end portion at the front end of the insert plate has a shorter outer diameter; sequentially, it extends rearwards to a longer outer diameter to form inclined side; the front rim of the inner hole of the elongate through hole has a longer inner diameter that sequentially extends rearwards to form a shorter inner diameter; when the insert plate inserts transversely into the insert hole of the retaining convex portion, it makes the inclined side of the insert plate further tightly fit with the hole wall plane of the insert hole and makes the convex outer post body further retain tightly with the hole wall of the elongate through hole.

8. An earphone wire winding box with coaxial and dual wheels according to claim 1, wherein the structure of the storage groove of the small turning wheel has a small disk lively engaged on the axial portion and clamped to the lateral end rim of the wheel plane of the small turning wheel; a transverse bar is disposed at a proper position on an outer groove wall of the storage groove adjacent to the wheel plane; thereby the communication wire can be clamped in a clamp slot formed between the transverse bar and the wheel plane; the outer circumferential rim of the outer groove wall is disposed with a concave groove for the passage of the communication wire.

9. An earphone wire winding box with coaxial and dual wheels according to claim 8, wherein a bowl-shaped body with a through hole and a bushing piece with a through hole are fixedly connected to the outer side of the axial portion and press against the bushing piece to enhance the rotary stability of the big wheel; wherein a bowl-shaped body with a through hole is inserted fixedly to the inner side of the axial portion to push and connect lively to the lateral wall plane of the disk so as to enhance the connection and synchronously rotary stability between the big and the small turning wheels.

* * * * *